United States Patent
Cote

(10) Patent No.: US 6,543,384 B2
(45) Date of Patent: *Apr. 8, 2003

(54) BIRD FEEDER HAVING LOWER MOVABLE SHROUD

(76) Inventor: Paul Cote, 18 Valleyview Rd, P.O. Box 64, Knowlton, Quebec (CA), J0E 1V0

(*) Notice: Subject to any disclaimer, the term of this patent is extended or adjusted under 35 U.S.C. 154(b) by 0 days.

This patent is subject to a terminal disclaimer.

(21) Appl. No.: 10/056,259

(22) Filed: Jan. 11, 2002

(65) Prior Publication Data

US 2002/0139311 A1 Oct. 3, 2002

(30) Foreign Application Priority Data

Jan. 12, 2001 (CA) .............................................. 2330868

(51) Int. Cl.⁷ ............................................... A01K 39/01
(52) U.S. Cl. ...................................................... 119/57.9
(58) Field of Search ............................. 119/52.2, 52.3, 119/52.4, 57.8, 57.9, 51.01

(56) References Cited

U.S. PATENT DOCUMENTS

| 4,144,842 A | * | 3/1979 | Schlising | 119/52.3 |
| 4,646,686 A | * | 3/1987 | Furlani | 119/57.9 |
| 5,163,382 A | * | 11/1992 | Morrison | 119/57.9 |
| 5,195,459 A | * | 3/1993 | Ancketill | 119/52.3 |
| 5,445,109 A | * | 8/1995 | Gray et al. | 119/57.9 |
| 5,720,238 A | * | 2/1998 | Drakos | 119/57.9 |
| 5,964,183 A | * | 10/1999 | Czipri | 119/52.3 |
| 6,155,205 A | * | 12/2000 | Coates | 119/52.3 |
| 6,253,707 B1 | * | 7/2001 | Cote | 119/57.9 |

* cited by examiner

Primary Examiner—Charles T. Jordan
Assistant Examiner—Kimberly S. Smith
(74) Attorney, Agent, or Firm—Eric Fincham

(57) ABSTRACT

A squirrel proof bird feeder wherein there is provided a lower movable shroud which extends about a lower portion of the feed container having feed access openings therein, a spring member biasing the shroud to a position wherein feed container access openings and shroud access openings are substantially aligned while permitting the shroud access opening to move out of alignment with the feed container access opening when a predetermined weight is placed on the shroud. An adjustment is provided for adjusting the weight required to move the shroud.

19 Claims, 18 Drawing Sheets

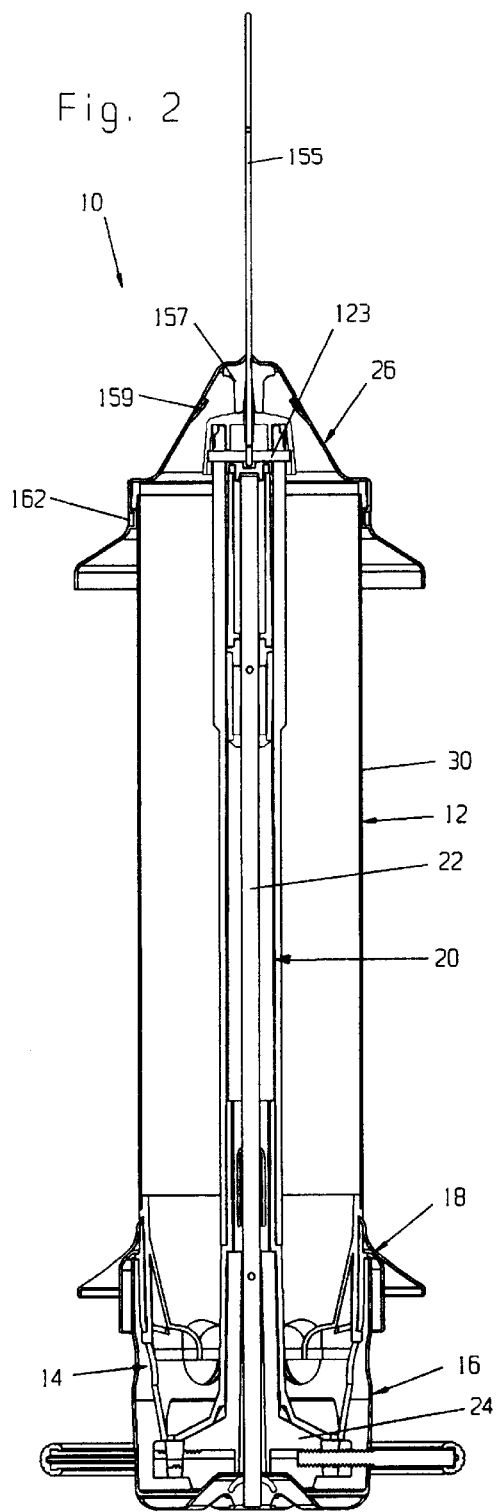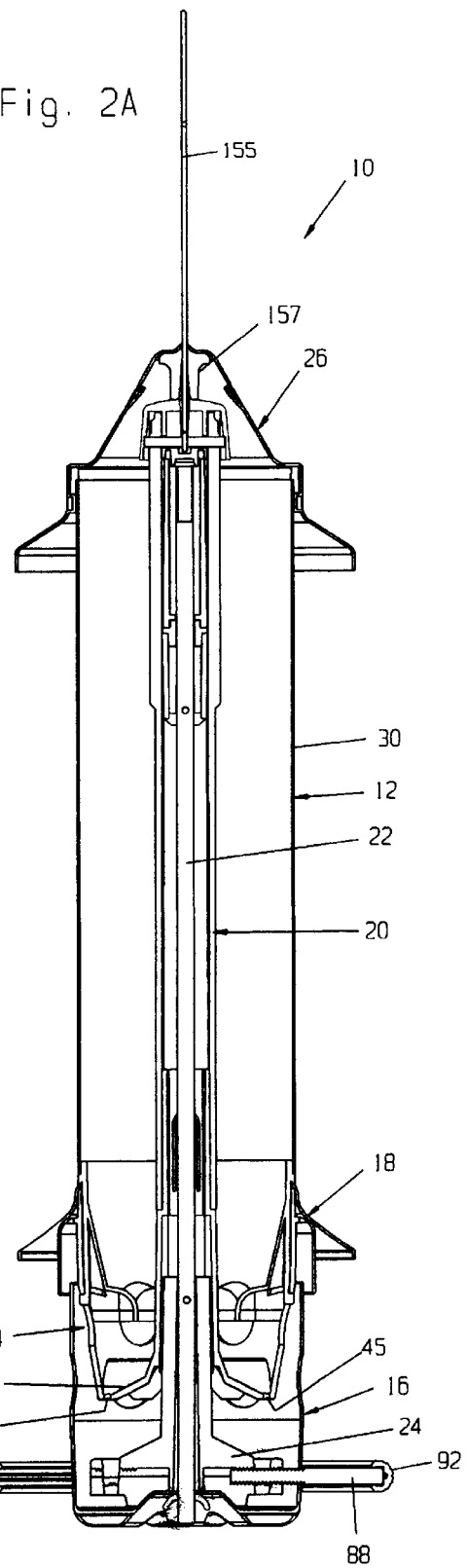

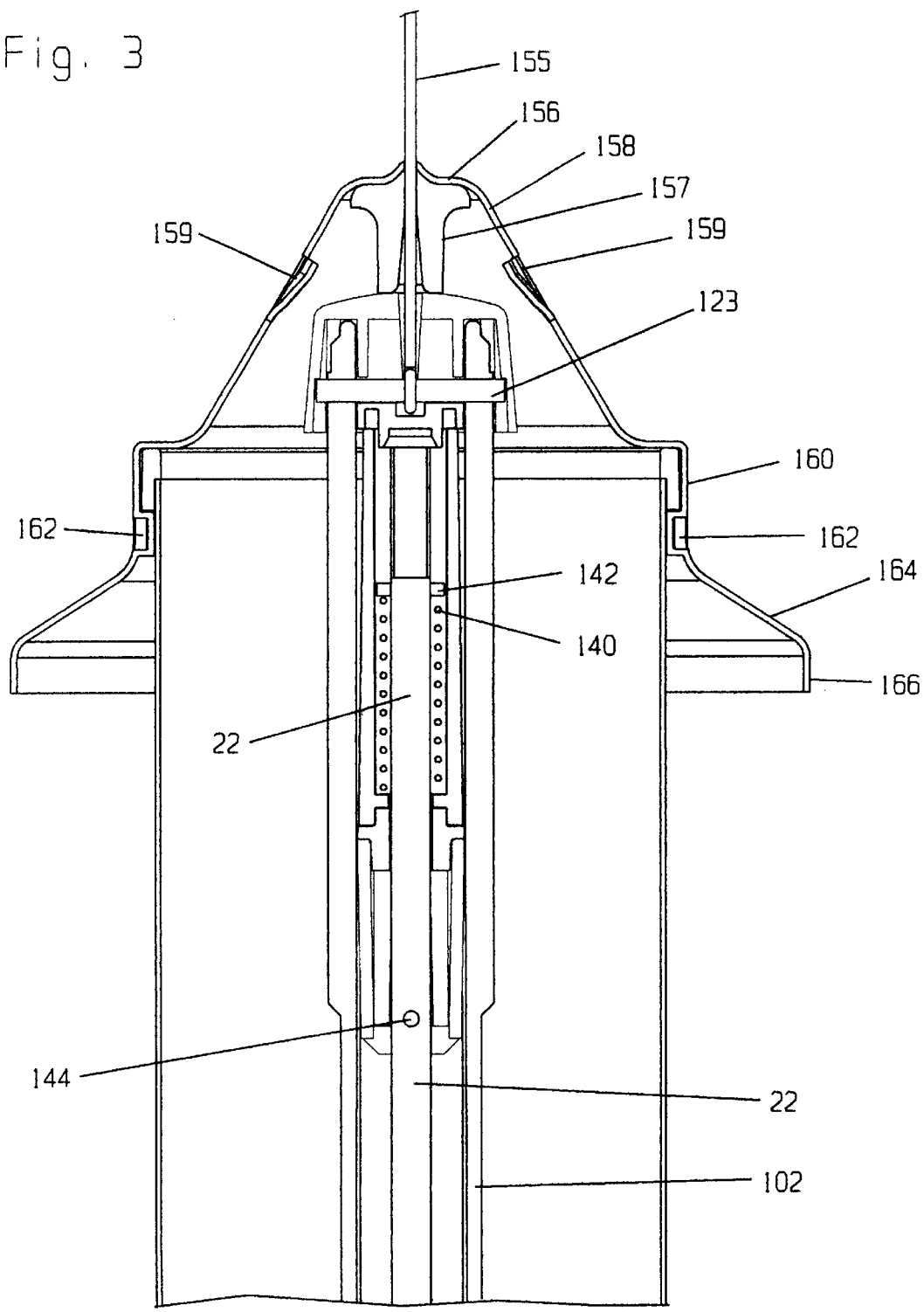

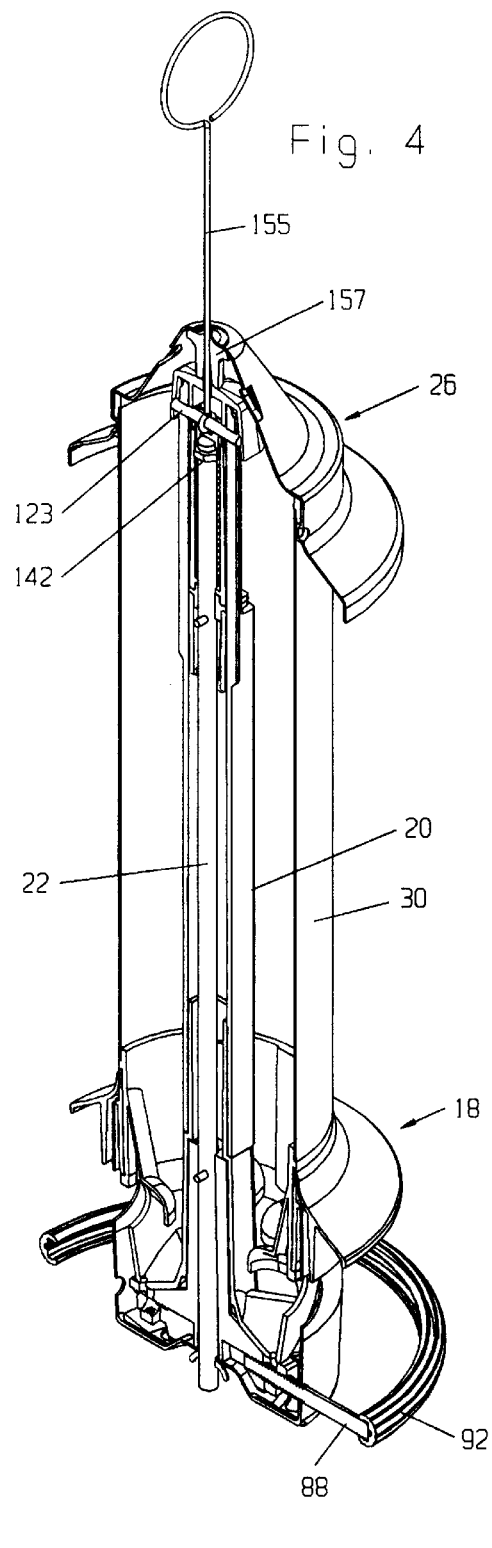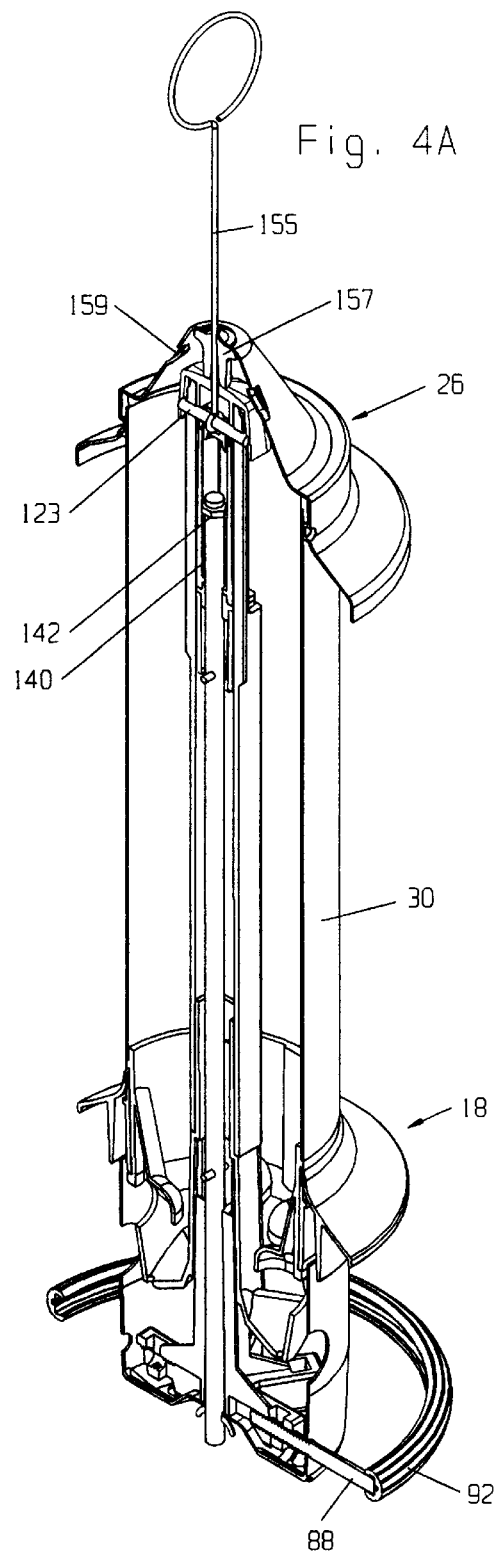

BIRD FEEDER HAVING LOWER MOVABLE SHROUD

FIELD OF THE INVENTION

The present invention relates to bird feeders, and more particularly relates to improvements therein.

BACKGROUND OF THE INVENTION

Selective bird feeders are well known in the art and are designed to limit the maximum size of a bird or animal which can access the seed in the feeder. The reasons for excluding certain birds may be many. Thus, as disclosed in U.S. Pat. No. 3,241,525, there is provided a selective bird feeder which is specific to cardinals. As taught by this patent, a favorite seed of cardinals is the sunflower seed; this seed is also popular with both smaller and larger birds.

Some larger birds will also access the seed and many such birds including crows, grackles, blue jays and the like are considered by some people to be undesirable.

A further problem associated with bird feeders is marauders which gain access to the seeds. In particular, squirrels are well known for their ability to reach the seed in a bird feeder and to devour the same. Many approaches have been tried to discourage or prevent squirrels from reaching the bird feeder, including various types of covers and baffles on poles. These seldom work as the squirrels have shown great ingenuity in overcoming such devices.

Some of the attempted solutions to the problem are disclosed in the prior art such as exemplified by U.S. Pat. No. 4,646,686 to Furlani which teaches a movable shroud. U.S. Pat. No. 3,145,690 to Bachman describes a bird feeder in which an inverted cylindrical hopper is suspended over a feeding pan; a bird perch surrounds the pan and is attached to a conical shroud. Both the perch and the shroud are supported by a compression spring whereby heavier birds or mammals on the perch cause the shroud to move downwardly.

Another shroud arrangement is shown in U.S. Pat. No. 3,126,870 wherein a cylindrical shroud surrounds a hopper and is mounted for rotation about a vertical axis under the bias of a weight.

While all of the above references disclose shroud type arrangements, such devices have not appeared to have received commercial acceptance in the marketplace. It might be surmised that this is due to the fact that some of the arrangements are relatively complicated and/or expensive to produce.

SUMMARY OF THE INVENTION

It is an object of the present invention to provide an adjustably selective bird feeder having a movable shroud to protect and isolate the access openings by which the birds can gain access to the feed in the container from unwanted intruders.

It is a further object of the present invention to provide an adjustably selective bird feeder which uses a compressible member such as a spring to cause the shroud to move and protect the access openings when predetermined weight is placed thereon.

It is a further object of the present invention to provide a feed container for a bird feeder which is easy to manufacture and uses a minimum of components.

It is a further object of the present invention to provide a bird feeder which can be easily disassembled without the use of tools to provide for easy repair and easy access for cleaning.

According to one aspect of the present invention, a bird feeder comprising a feed container having a base and an outer wall extending upwardly therefrom, at least one feed container access opening in the outer wall, a cover member, the cover member being removably connected to an upper portion of the feed container, a shroud extending about at least a portion of the feed container, at least one shroud access opening substantially aligned with the feed container access opening to thereby permit access to the feed container, an elongated hollow center tube within the feed container, the hollow center tube being connected to the feed container, an elongated rod within the center tube, the rod being connected to the shroud at a lower end of the rod, the rod being movable within the center tube axially, and biasing means associated with the rod at an upper end thereof, the biasing means biasing the rod and the shroud to a position wherein the feed container access opening and the shroud access opening are substantially aligned while permitting the shroud access opening to move out of alignment with the feed container access opening when a predetermined weight is placed on the shroud.

In a greater detail, the bird feeder of the present invention is designed as a multi component device which can be easily assembled and disassembled without the use of tools. Furthermore, the components of the feeder, when disassembled, can be placed in a cleaning device such as a dishwasher to sanitize all the components and thus prevent the spread of disease which is a frequent problem associated with bird feed which remains in the container for a substantial period of time.

The bird feeder of the present invention can be sized to meet the requirements of the industry. Thus, the feed container, which is preferably formed of a transparent plastic material, can be sized to accept the desired amount of bird feed. Preferably, it is made of a material which will resist the attack of marauders such as squirrels and to this end, a plastic material such as Lexan® may be utilized.

The components of the bird feeder which might be subject to attack by the marauders such as squirrels can be made of an appropriate metallic material such as aluminum. Thus, the cover and the shroud would most desirably be made of such a metallic material.

BRIEF DESCRIPTION OF THE DRAWINGS

Having thus generally described the invention, reference will be made to the accompanying drawings illustrating a preferred embodiment thereof, in which:

FIGS. 2 and 2A are side sectional views of the feeder in a retracted and extended position respectively;

FIG. 3 is an enlarged sectional view of the upper portion of the feeder in an extended position;

FIGS. 4 and 4A are cut away views of the bird feeder in a retracted and extended position respectively;

FIGS. 14 and 14A are perspective and cross sectional views respectively of the hub portion of the bird feeder according to one embodiment of the present invention;

FIGS. 19 and 19A are side elevational and side sectional views respectively of the shroud;

DESCRIPTION OF THE PREFERRED EMBODIMENTS

Figure 1:
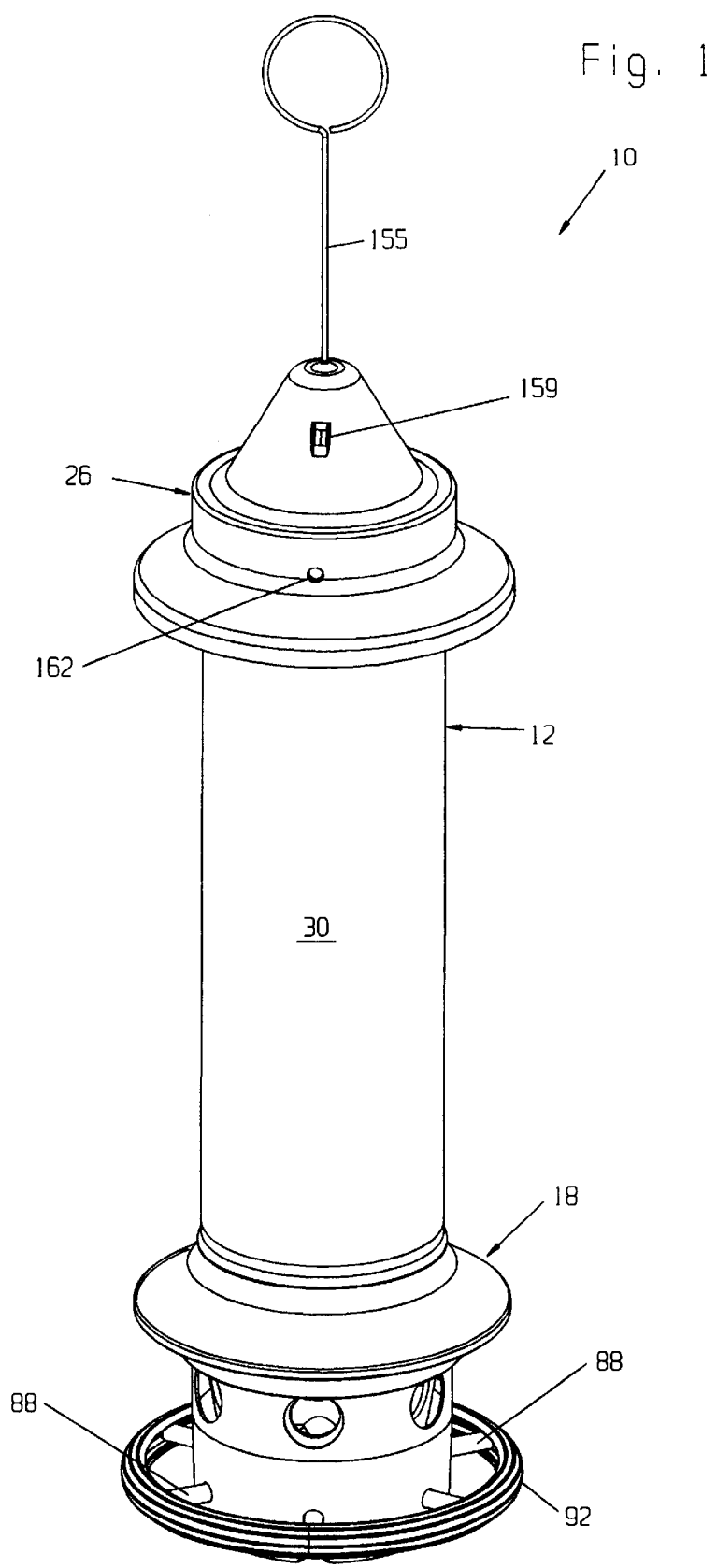
FIG. 1 is a perspective view of one embodiment of a bird feeder according to the present invention.

Referring to the drawings in greater detail and by reference characters thereto, there is illustrated a bird feeder which is generally designated by reference numeral 10.

Bird feeder 10 has several major components as identified in FIGS. 2 and 2A. These components include an upper feed container 12, a lower feed container 14, a shroud 16, a skirt 18, an inner tube 20, a rod 22, a center hub 24 and a cover 26.

Upper feed container 12 comprises a transparent cylindrical tube 30. Lower feed container 14 is formed of two members; an inner portion 32 of lower feed container 14 (which is best seen in FIG. 9) and an outer portion 40 of the lower feed container 14 (best illustrated in FIG. 12).

Figure 9:
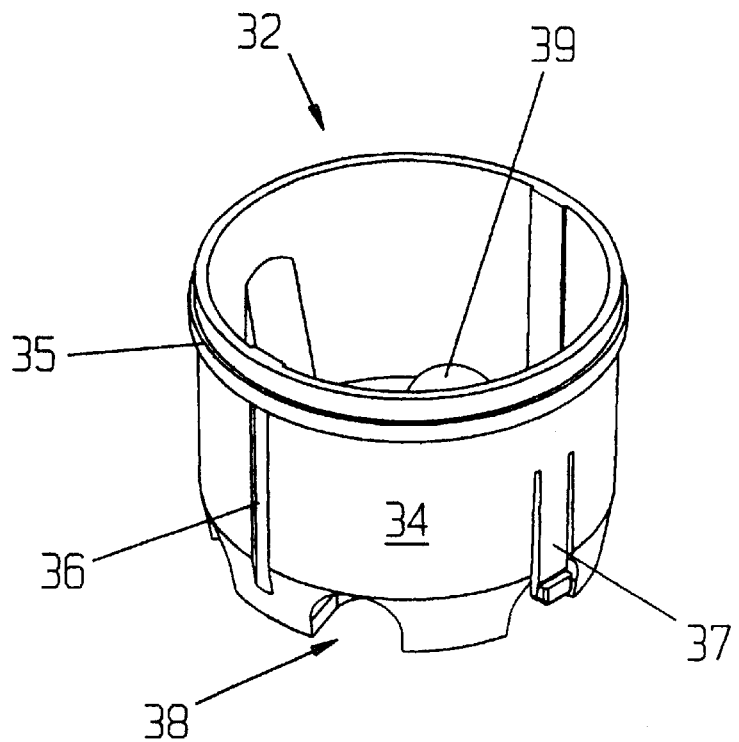
FIG. 9 is a perspective view of the inner portion of the lower feed container.

Referring initially to FIG. 9, inner portion 32 of lower feed container 14 is generally cylindrical in configuration and includes a side wall 34 having an upper rim 35 extending thereabout. A pair of diametrically opposed vertical recesses 36 are provided for locating purposes as will be discussed in greater detail hereinafter. Also, a pair of diametrically opposed spring tabs 37 are utilized for connecting inner portion 32 to outer portion 40. Inner portion 32 also includes a plurality of baffles 39 and recessed inner portions generally designated by reference numeral 38 for reasons which will become apparent hereinbelow.

Figure 12:
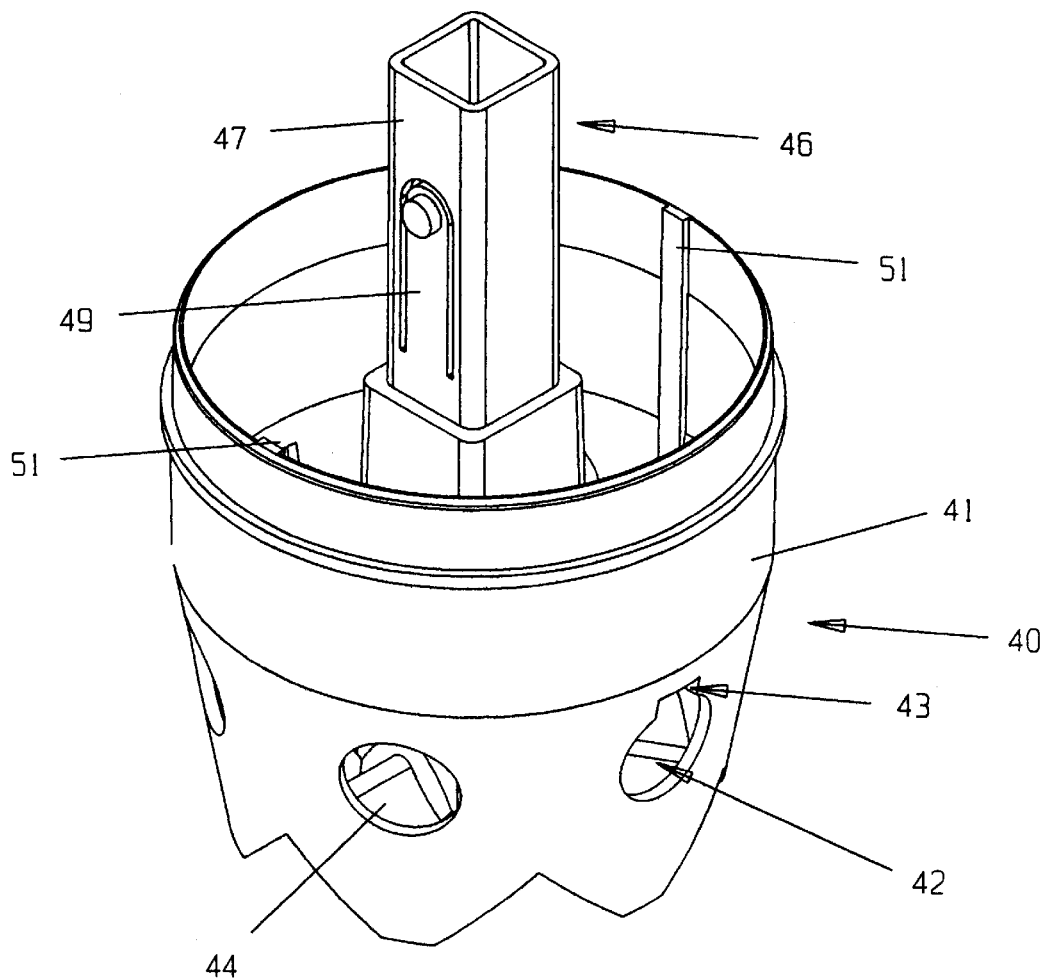
FIG. 12 is a perspective view of the outer portion of the lower feed container.

Outer portion 40 of lower feed container 14, as seen in FIG. 12, is also generally cylindrical in configuration and includes an outer side wall 41 in which there are provided a plurality of feed access openings 42. At a pair of diametrically opposed feed access openings 42, there are provided notches 43 which are designed to receive spring retaining tabs 37 to interconnect inner portion 32 and outer portion 40. Guide ribs 51 align the portion by fitting within recesses 36. A bottom wall 44 is formed of a plurality of triangular configurations to direct seed and also to provide for drainage through drainage apertures 45 (FIG. 2A). The outer portion 40 also includes a centrally located center post 46 which has an upper tapered portion 47 and a lower portion 48. Upper portion 47 is provided with tabs 49 for interconnection to inner tube 20.

Inner portion 32 and outer portion 40 of lower feed container 14 are assembled and the arrangement is such that the baffles 39 are situated above feed access openings 42 and recessed portions 38 align with feed access openings 42.

Figure 14:
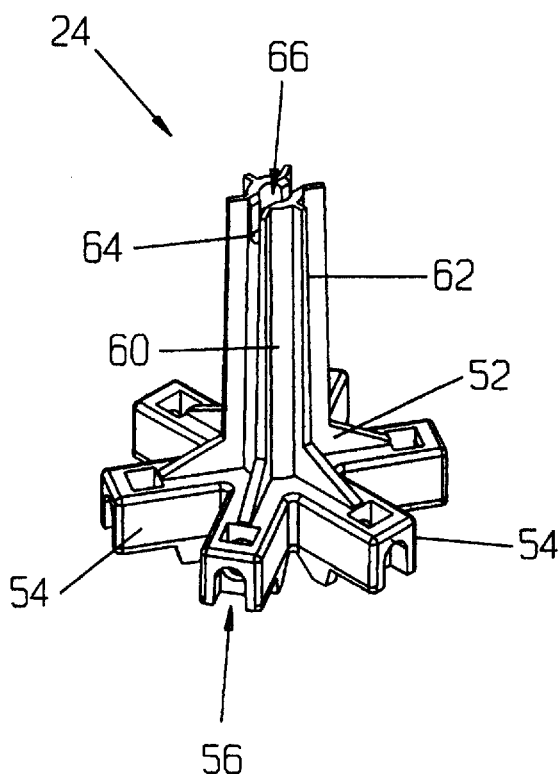
Figure 14:
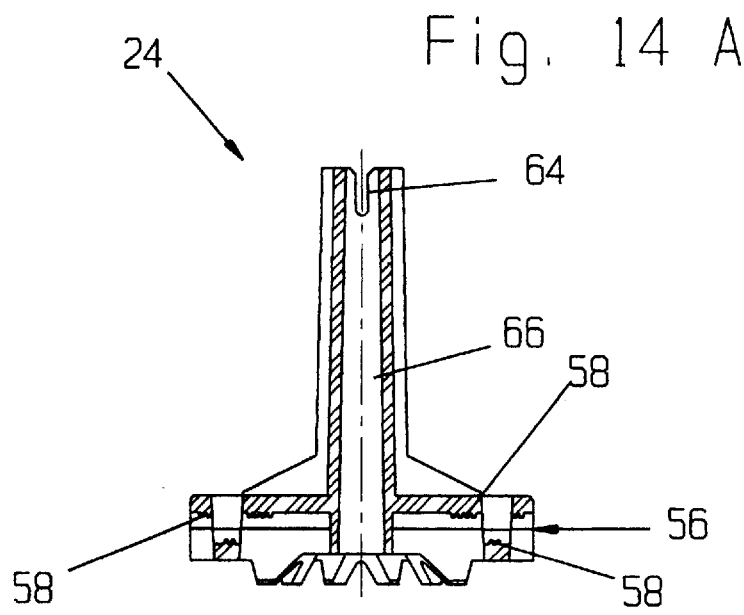

Center hub 24 (FIGS. 14,14A) includes a central portion 52 having a plurality of radially extending arms 54. Within each radially extending arm 54 there is provided a channel 56 having screw threads 58 extending partially thereabout.

Center hub 24 also includes an upwardly extending center post 60 and which post 60 has a pair of diametrically opposed side guide flanges 62. A somewhat V-shaped slot 64 is formed in the upper end of center post. Center post 60 includes a central channel 66 designed to receive rod 22.

Figure 19:
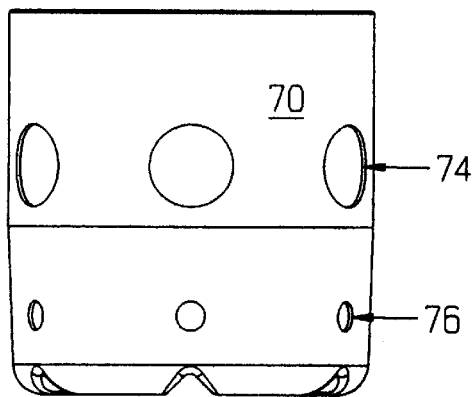

Shroud 16 (FIGS. 19, 19A) has a shroud side wall 70 with a plurality of feed access openings 74 being formed in side wall 70. Situated below each feed access opening 74 is an aperture 76 to permit passage of a perch. A bottom wall 78 has a plurality of seed drainage apertures 80 formed therein. An upwardly extending center hub portion 82 is designed to receive the lower portion of center hub 24 and has an aperture 84 located centrally thereof.

Figure 5:
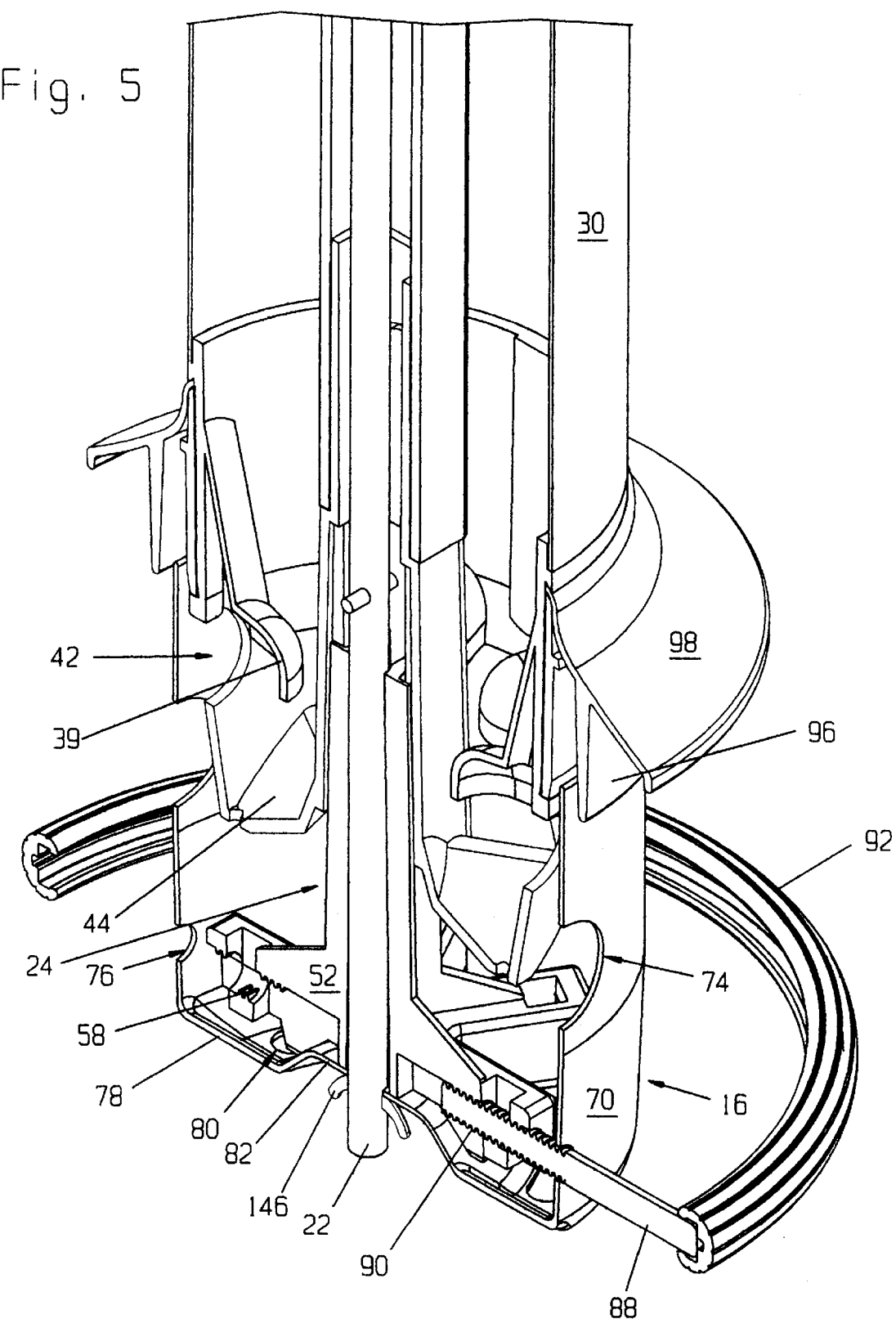
FIG. 5 is an expanded cut away view of the lower portion of the bird feeder in an extended condition.

There are provided a plurality of perches 88 (FIG. 5) each having screw threads 90 formed on one end thereof for screw threaded engagement with screw threads 58 on radial arms 54 of center hub 24. A circular perch 92 (as seen in FIGS. 1, 4 and 4A) interconnects the distal non screw threaded ends of perches 88 and is retained thereby.

Figure 20:
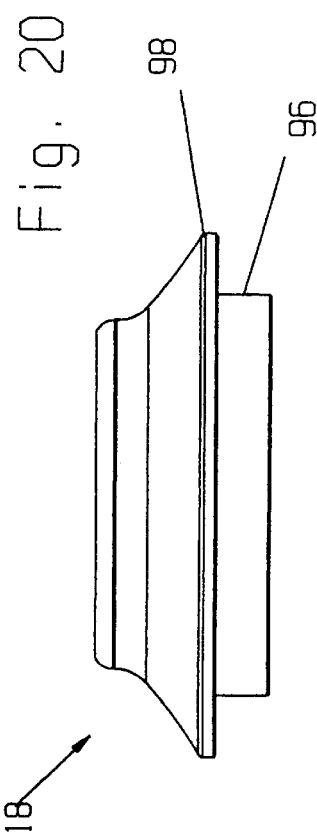
FIG. 20 is a side elevational view of the skirt portion of the bird feeder.
Figure 19:
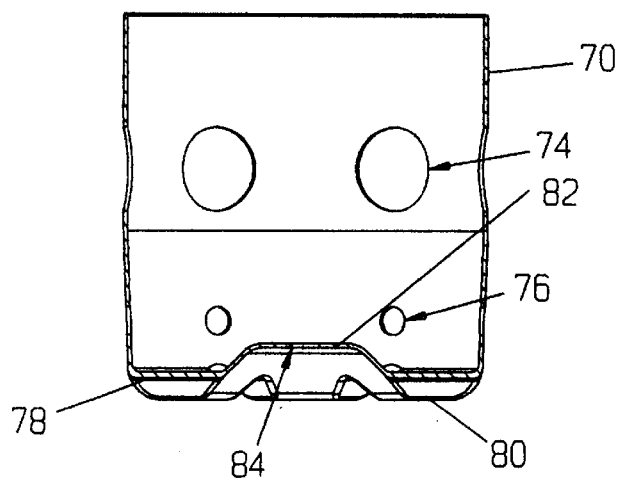

Skirt member 18 (FIG. 20) includes an inner cylindrical wall 96 and an outer skirt wall 98. In the illustrated embodiment, skirt member 18 is illustrated as being formed of a single piece; naturally, cylindrical wall 96 and outer skirt wall 98 may be formed separately and suitably secured together.

Figure 13:
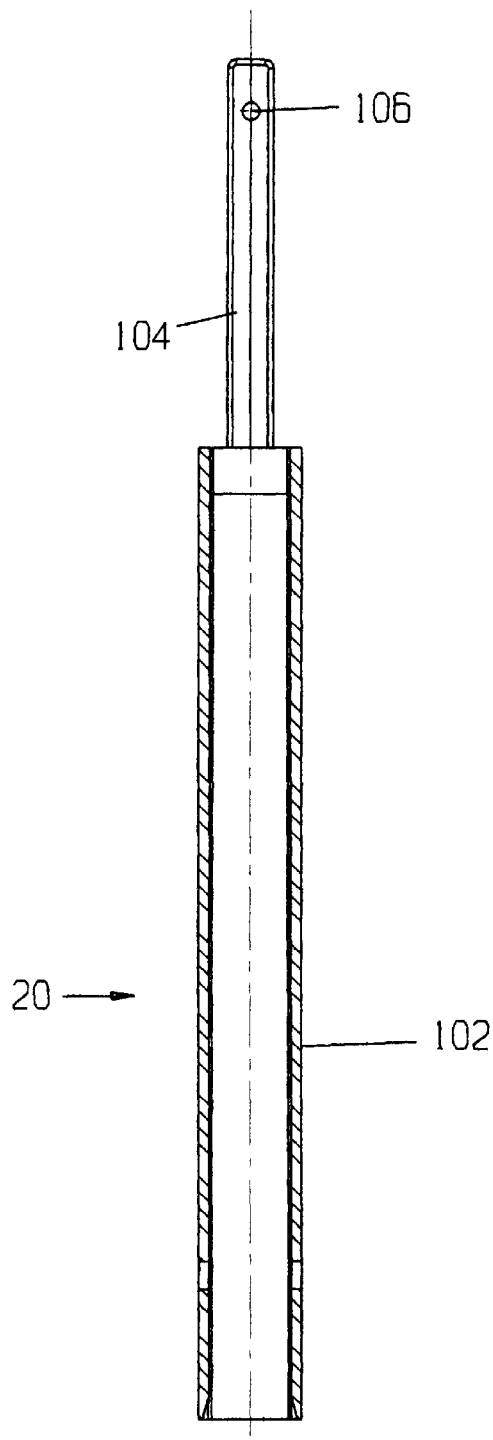
FIGS. 13 and 13A are side elevational views of the inner tube with the tube being rotated through 90°.
Figure 13A:
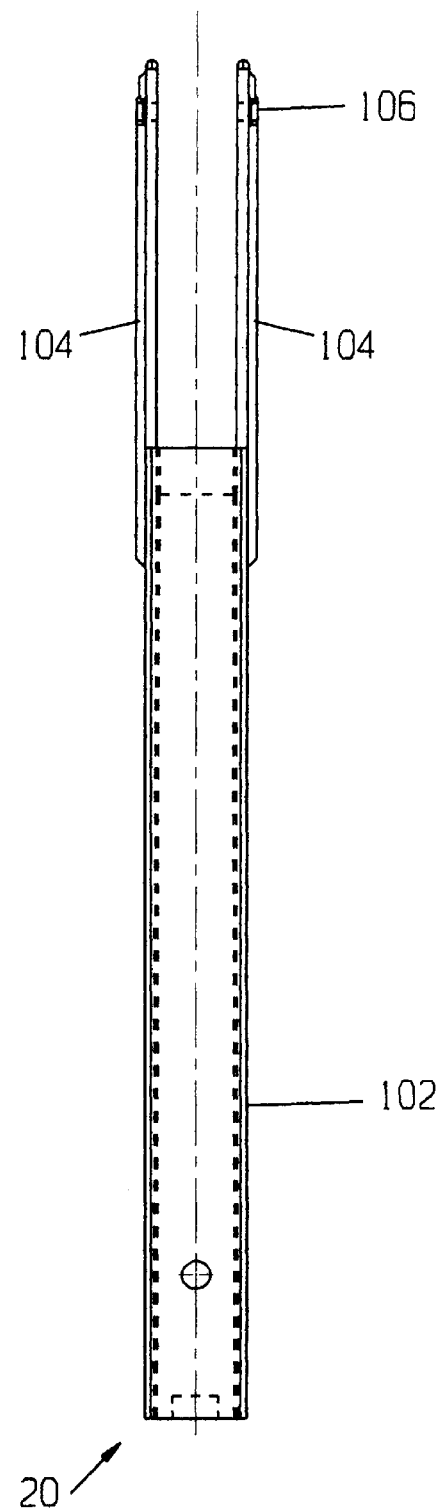

Inner tube 20 (FIGS. 13, 13A) has a lower cylindrical portion 102 which merges with a pair of upwardly extending forks 104. At an upper portion of forks 104 there are apertures 106 formed therein.

Figure 16:
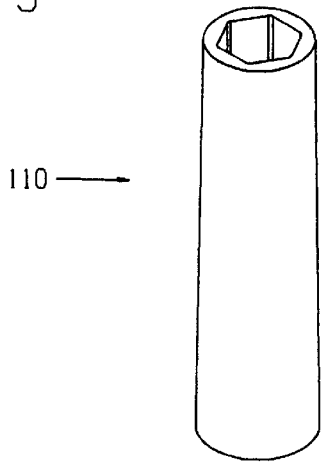
FIG. 16 is a perspective view of the cartridge portion.

An inner adjustment housing 110 (FIG. 16) is designed to fit between forks 104 and is rotatable on lower cylindrical portion 102 of inner tube 20. The inner walls of adjustment housing 110 are beveled to receive and retain a nut like member (see FIG. 16).

Figure 15:
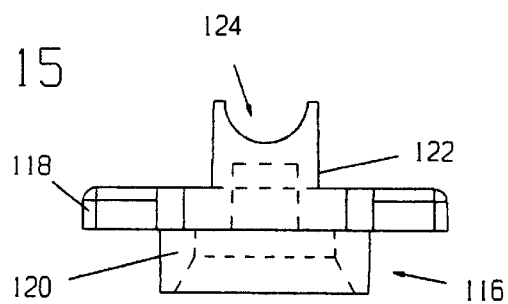
FIG. 15 is a side elevational view of the cap for the cartridge portion.
Figure 17:
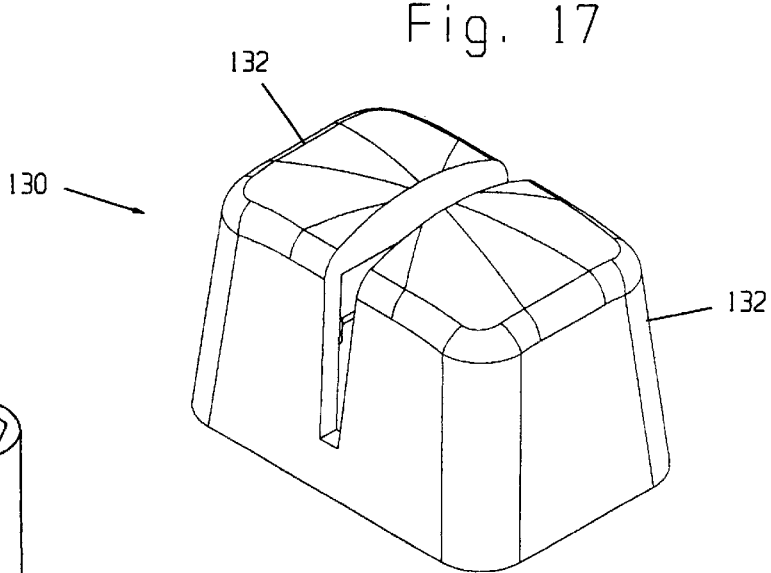
FIG. 17 is a perspective view of the center post cap.

A retaining member 116 (FIG. 15) is designed to retain housing 110 in position and to this end, includes a flat body portion 118, a lower cylindrical portion 120 designed to seat within inner adjustment housing 110 and a pair of upwardly extending arms 122. Each arm 122 has an upper groove 124 formed therein. Grooves 124 are designed to receive a retaining pin 123 which extends through apertures 106 and forks 104 to thereby secure the assembly together (FIG. 3).

An upper cap 130 is designed to seat on retaining member 116 and to this end, includes a pair of upwardly extending portions 132 designed to receive upper arms 122 while covering the member 116 and retaining pin 123 in position.

Figure 21:
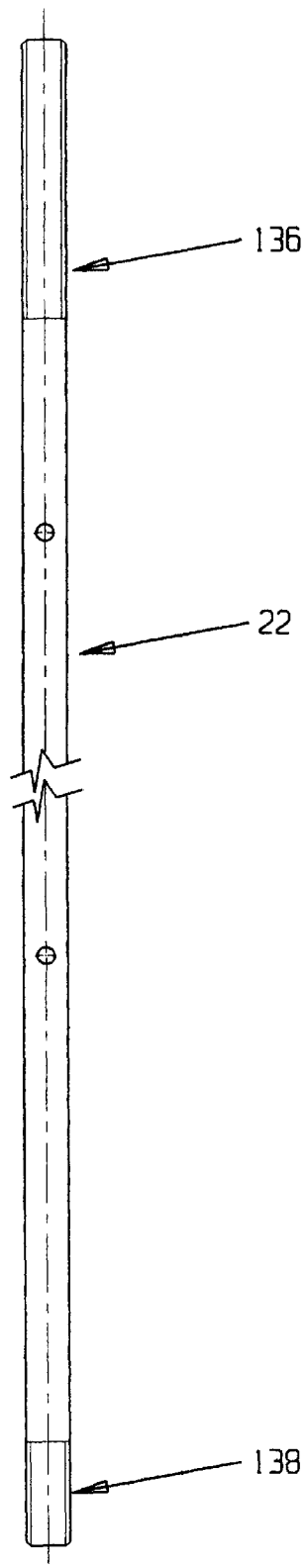
FIG. 21 is a side view of the center rod.

Center rod 22 (FIG. 21) has an upper threaded portion generally designated by reference numeral 136 and a lower threaded portion generally designated by reference numeral 138. The arrangement is such that inner adjustment housing 110, as aforementioned, fits between forks 104 and is rotatable on lower cylindrical portion 102. A stop member 144 extends through rod 22 to limit rod travel. Located inwardly of inner adjustment housing 110 is a spring 140 and which is retained therein by means of a nut 142 which is screw threadedly engaged with upper threaded portion 136 of rod 22. The arrangement is such that rotational movement of inner adjustment housing 110 will adjust the tension on spring 140 by shortening or lengthening the same. At its lower end, there is provided a wing nut 146 to engage lower screw threaded portion 138 of rod 22.

Figure 8:
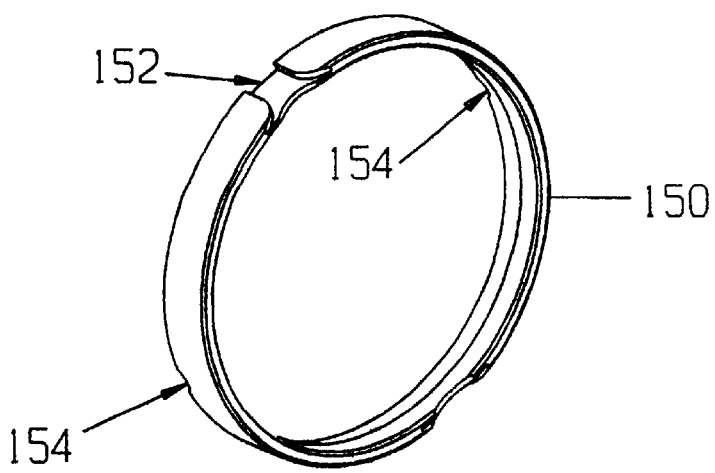
FIG. 8 is a perspective view of the rim cover of the bird feeder.

There is also provided a rim cover 150 (FIG. 8) which seats and is secured to the upper marginal edge of upper feed container 12. Rim cover 150 includes a pair of diametrically opposed slots 152 and recesses 154 for reasons which will become apparent hereinbelow.

Figure 18:
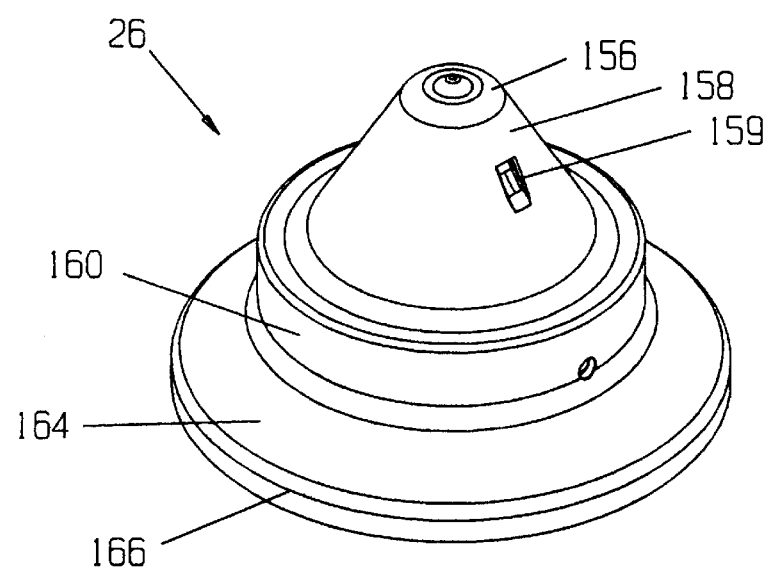
FIGS. 18 and 18A are perspective and side sectional views respectively of the cover.
Figure 18A:
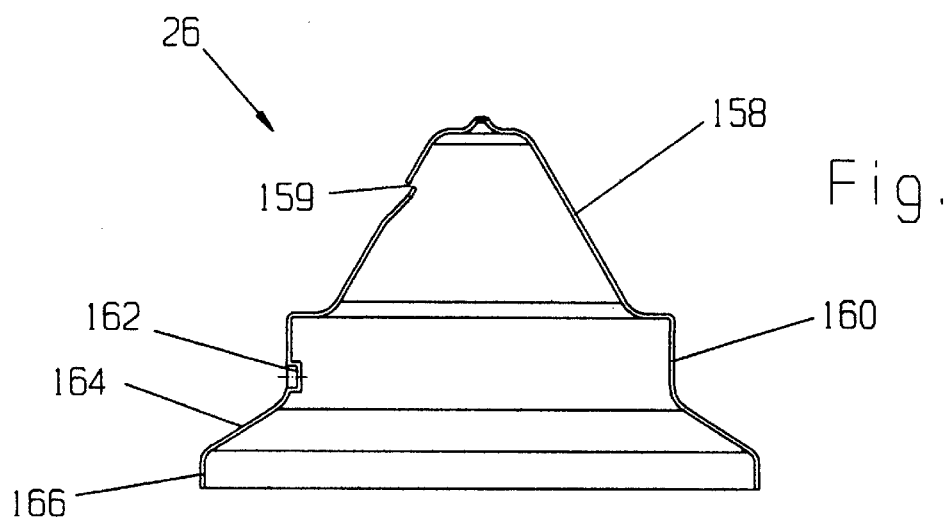

Cover 26 (FIGS. 18, 18A) includes a horizontal top wall 156 which merges with a first sloping side wall 158. Sloping side wall 158 in turn merges with a vertical wall 160 having a pair of diametrically opposed indents 162 thereon. Indents 162 are designed to fit within slots 152 on rim cover 150 to permit the placing and the locking of cover 26 in position (recesses 154). At the lower end of vertical wall 160, there is provided a second sloping wall 164 which terminates in a drip edge 166. Vents 159 are formed in side wall 158.

In assembly, center hub 24 is placed within shroud 16 and perches 88 are inserted through perch openings 76 and screw threadedly engaged within radial arms 54. Perches 88 may be adjusted to the desired distance to which they extend outwardly and if desired, circular perch 92 may be placed thereon and which circular perch 92 is retained in position by the distal ends of perches 88.

Outer portion 40 of lower feed container 14 is then placed such that hub center post 60 extends within tapered center post 44 of lower feed container 14. The tapered arrangement prevents binding when shroud 16 moves downwardly to deny access to the feed access openings 38. The rib in the hub and the slot in the center post maintain alignment. In this respect, they are both tapered (two directions) to ensure easy movement of the parts.

Skirt 18 is then placed over outer portion 40 of lower feed container 14 and seats thereon. Inner wall 96 extends about the top of the shroud to cover the shroud in both positions. The skirt 18 also acts as a bumper and prevents a squirrel from having any access.

Inner portion 32 of lower feed container 14 is then placed in position with tabs 37 engaging notches 43. Upper feed container 12 fits about the upwardly extending portion of the inner portion 34 of lower feed container 14.

Cover 26 is then placed in position with indents 162 passing through slots 152 on rim cover 150; the cover 26 is then rotated such that the indents are engaged with recesses 154 to maintain cover 26 in position. A hanger 155 (FIG. 1) engages retaining pin 123 and passes through an aperture formed in top wall 156 of cover 26. In this respect, a sealing member 157 extends between upper cap 130 and cover 26 to prevent the entry of any moisture. Sealing member 157 is under compression between cover 26 and cap 130.

The above arrangement provides a unique squirrel resistant feeder which provides maximum benefits in operation.

The perches, as previously mentioned, are adjustable in length and can be shortened to attract small birds such as chickadees and finches while deterring larger birds such as grackles and starlings. The ring system permits the user to attract cardinals who normally dislike turning their heads to feed. In a preferred embodiment, the perches can be locked into position by providing that the perch openings 76 in shroud 16 are slightly off center with respect to channels 56 of center hub 24. Thus, when wing nut 146 is loosened, perches 88 may easily be inserted through the lined openings or apertures. A tightening of wing nut 46 will place the openings slightly off center and exert a pressure on perches 88 by side wall 70 of shroud 16. Alternatively, screw threads 58 in channel 56 may be designed to be somewhat resilient (similar to a nylon locking nut) to provide a greater locking security for perches 88.

The feeder of the present invention provides a ventilation system to permit the egress of hot air. As will be understood, due to the transparent nature of the upper feed container 12, solar energy will cause heating and it is desirable to provide for ventilation. The present invention utilizes two means to permit the egress of the heated air—through vents 159 and also through slots 152 on rim cover 150.

Figure 6:
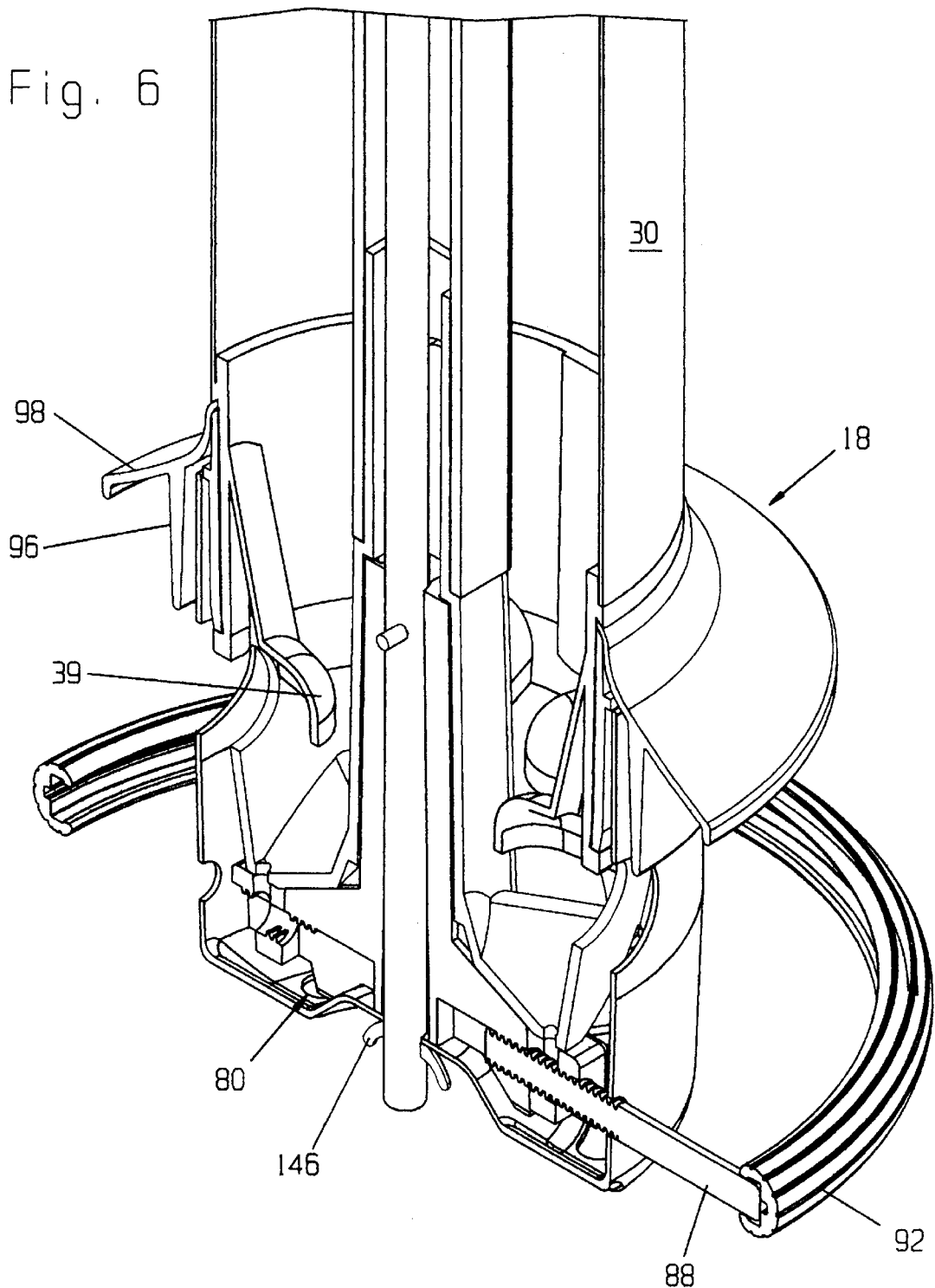
FIG. 6 is an enlarged cut away view of the lower portion of the bird feeder in a retracted condition.
Figure 7:
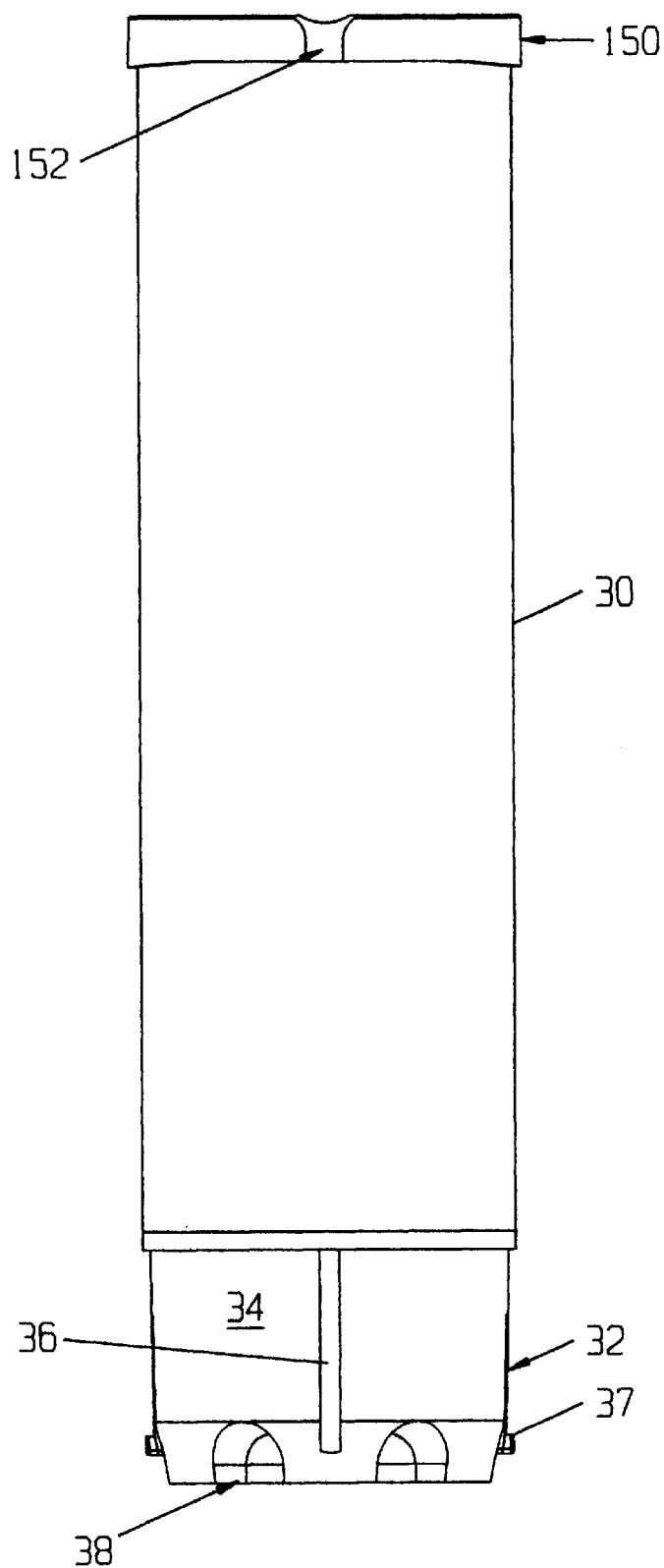
FIG. 7 is a side view of portions of the feed container.
Figure 7A:
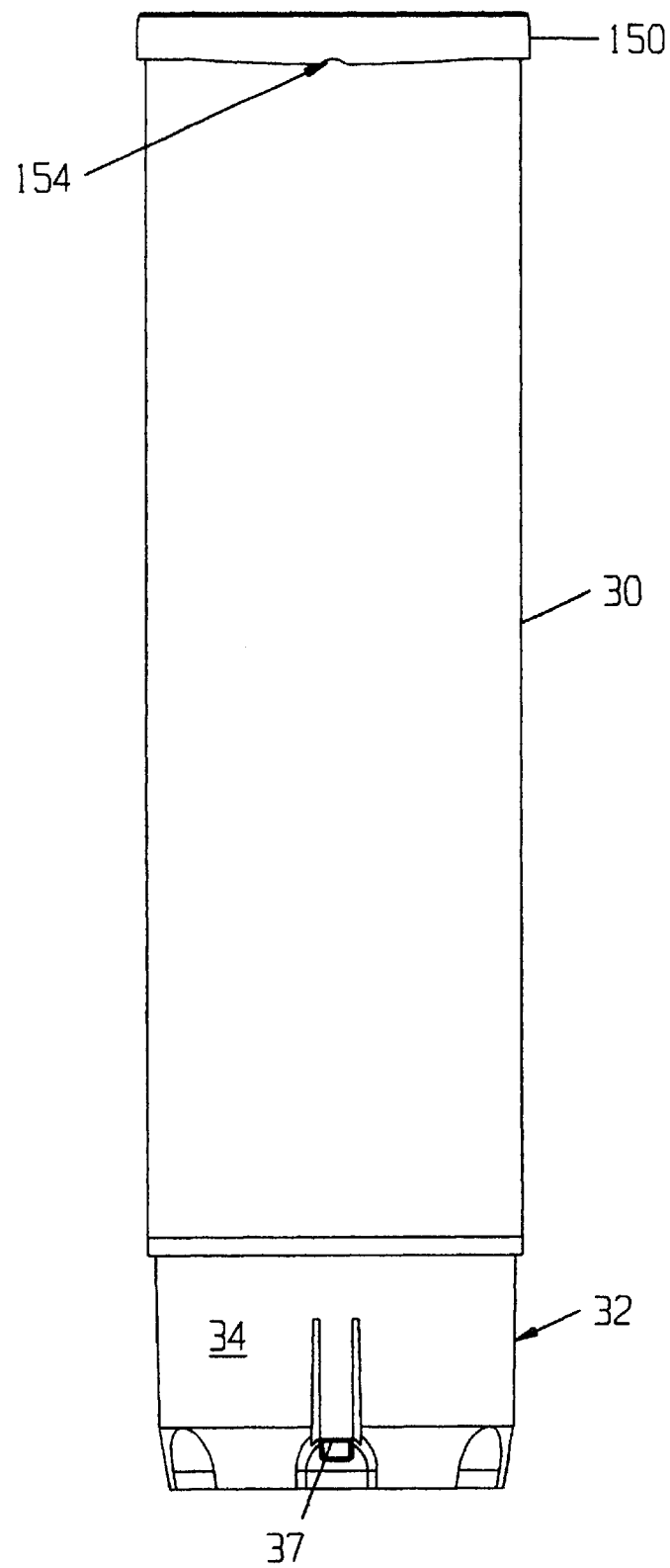
FIG. 7A is a view similar to FIG. 7 with the feed container being rotated through 90°.
Figure 10:
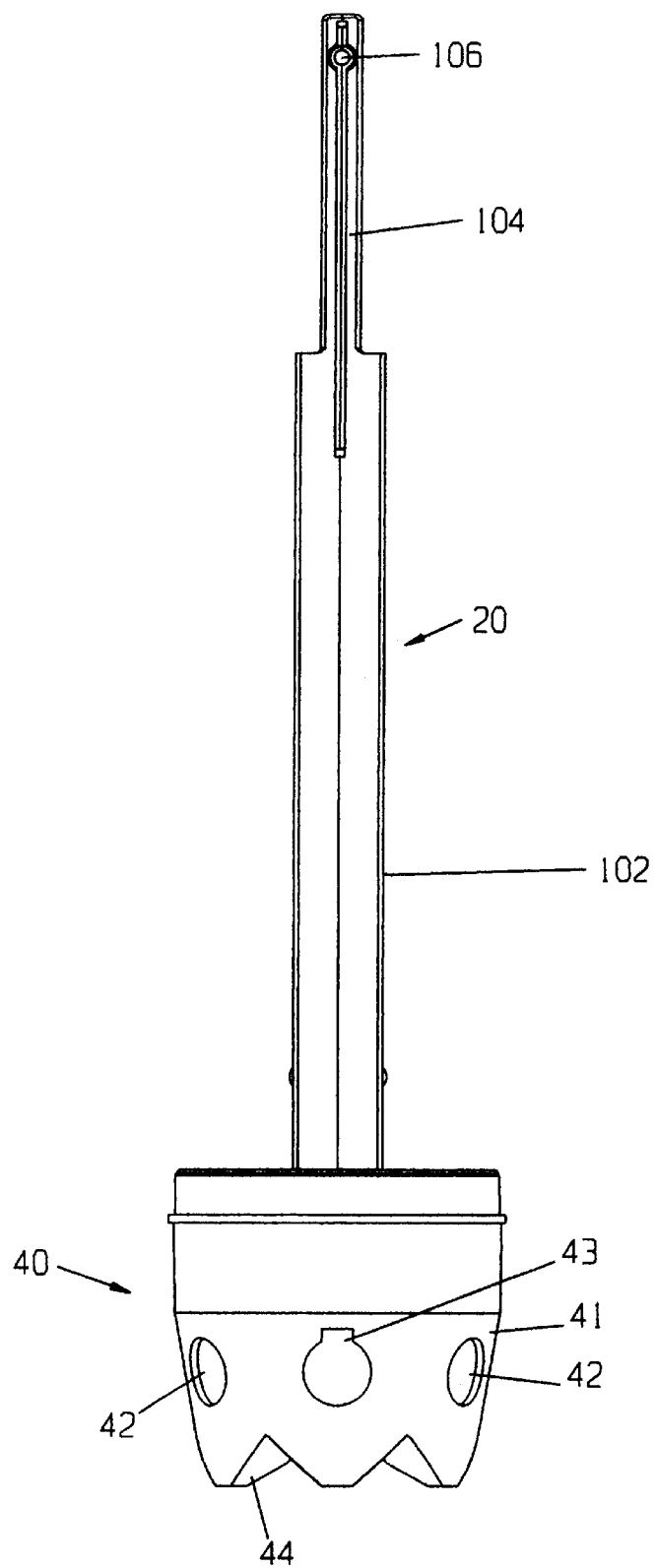
FIG. 10 is a side view of the assembled inner tube and lower feed container.
Figure 11:
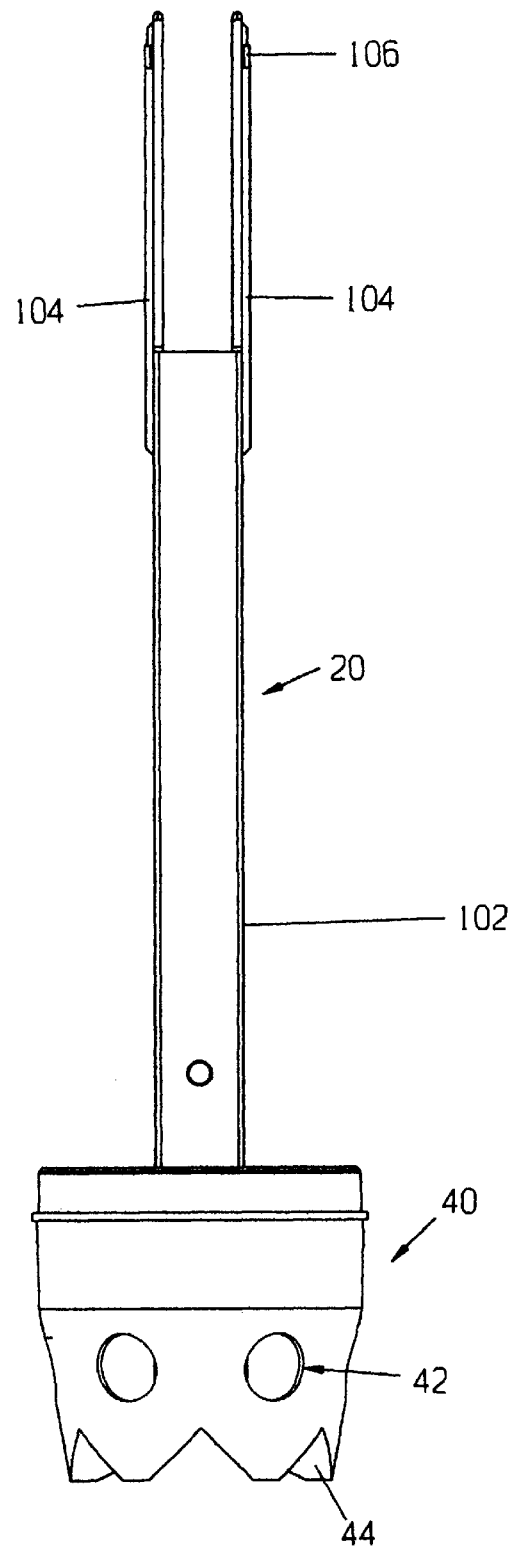
FIG. 11 is a view similar to FIG. 10 with the assembly being rotated through 90°.

As will be seen in FIG. 10, wall 41 is tapered inwardly at its lower extremities. This provides for an increasing distance between the shroud and wall 41 as may be seen in FIG. 6. This enables any seed which is jammed between the shroud and wall to escape.

It will be understood that the above described embodiments are for purposes of illustration only and that changes and modifications may be made thereto without departing from the spirit and scope of the invention.

I claim:

1. A bird feeder comprising:
    a feed container having a base and an outer wall extending upwardly therefrom, at least one feed container access opening in said outer wall;
    a cover member, said cover member being removably connected to an upper portion of said feed container;
    a shroud extending about at least a portion of said feed container, at least one shroud access opening substantially aligned with said feed container access opening to thereby permit access to said feed container;
    an elongated hollow center tube within said feed container, said hollow center tube being connected to said feed container;
    an elongated rod within said center tube, said rod being connected to said shroud at a lower end of said rod, said rod being axially movable within said hollow center tube; and
    biasing means associated with said rod at an upper end thereof, said biasing means biasing said rod and said shroud to a position wherein said feed container access opening and said shroud access opening are substantially aligned while permitting said shroud access opening to move out of alignment with said feed container access opening when a predetermined weight is placed on said shroud.

2. The bird feeder of claim 1 further including a protective skirt extending about and outwardly from a lower portion of said feed container, said shroud having a generally cup shaped configuration with an upper marginal edge thereof being protected by said skirt.

3. The bird feeder of claim 1 wherein said biasing means comprises a coil spring, a first end of said coil spring abutting a portion of said rod, a second end of said coil spring abutting said center tube.

4. The feeder of claim 3 further including means for adjusting the effective length of said coil spring to thereby adjust the force required to cause said shroud access opening to move out of line with said feed container access opening.

5. The bird feeder of claim 1 further including a plurality of perches, said perches being screw threadedly engaged with said feeder and extending outwardly from said shroud.

6. The bird feeder of claim 2 wherein said feed container comprises a feed container upper portion and a feed container lower portion, said feed container lower portion being connected to said protective skirt and to said center tube.

7. The bird feeder of claim 6 further including drainage apertures formed in said feed container lower portion.

8. The bird feeder of claim 2 further including an internal reinforcing member situated internally of said shroud, said internal reinforcing member having perch receiving apertures formed therein.

9. The bird feeder of claim 1 further including an inner adjustment housing within an upper portion of said hollow center tube.

10. The bird feeder of claim 9 further including a hanging member suitable for hanging said bird feeder, said hanging member being connected to said hollow center tube, said cover member having an aperture through which said hanging member passes.

11. The bird feeder of claim 2 wherein there are provided a plurality of feed container access openings in said outer wall of said feed container, and a plurality of shroud access openings, each one of said shroud access openings being substantially aligned with a corresponding feed container access opening.

12. The bird feeder of claim 1 further including vent means within an upper portion of said feeder to permit the egress of heated air from said feed container.

13. The feed container of claim 12 wherein said vent means includes a vent formed in said cover member.

14. The bird feeder of claim 5 further including an outer perch extending about a free end of said perches.

15. The bird feeder of claim 10 further including a sealing member extending between said cover and an upper portion of said center tube, said sealing member being maintained in compression when said cover is in position to thereby seal said aperture in said cover member.

16. The bird feeder of claim 1 wherein said biasing means comprises a housing having first and second ends extending about an upper end of said elongated rod, a coil spring mounted within said housing and extending around said elongated rod, said coil spring having a first end seating on an end of said housing and a second end thereof seating on a stop member within said housing, such that as said elongated rod moves downwardly, said coil spring becomes compressed.

17. The bird feeder of claim 16 wherein said housing may be moved to thereby adjust the tension on said coil spring.

18. The bird feeder of claim 17 wherein said housing is retained on said elongated rod is screw threadedly by means of a nut which engaged with said elongated rod.

19. The bird feeder of claim 1 wherein said outer wall of said feed container and an inner wall of said shroud are tapered with respect to each other such that when said shroud moves out of alignment with said feed container, a distance between said shroud wall and said outer wall increases.

* * * * *